United States Patent
Zamora et al.

(10) Patent No.: US 11,346,752 B2
(45) Date of Patent: May 31, 2022

(54) SIMULATED PAYLOAD APPARATUS FOR FLIGHT MOTION SYSTEM TESTING

(71) Applicant: Raytheon Company, Waltham, MA (US)

(72) Inventors: Karla J. Zamora, Tucson, AZ (US); Jaime Robledo, Tucson, AZ (US); Richard Jones, Tucson, AZ (US); Joel Reyes, Sahuarita, AZ (US); Devin Raymond, Tucson, AZ (US); Sergey Kokoulin, Tucson, AZ (US); Daniel B. Carman, Marana, AZ (US); Ashik Arefin, Orlando, FL (US)

(73) Assignee: Raytheon Company, Waltham, MA (US)

( * ) Notice: Subject to any disclaimer, the term of this patent is extended or adjusted under 35 U.S.C. 154(b) by 167 days.

(21) Appl. No.: 16/710,864

(22) Filed: Dec. 11, 2019

(65) Prior Publication Data

US 2021/0181066 A1 Jun. 17, 2021

(51) Int. Cl.
*G01M 99/00* (2011.01)
*G01P 13/00* (2006.01)

(52) U.S. Cl.
CPC ........... *G01M 99/007* (2013.01); *G01P 13/00* (2013.01)

(58) Field of Classification Search
CPC ......... G09B 9/12; G01M 99/007; G01P 13/00
See application file for complete search history.

(56) References Cited

U.S. PATENT DOCUMENTS

| | | | | |
|---|---|---|---|---|
| 3,085,354 A | * | 4/1963 | Rasmussen | G09B 9/12 434/31 |
| 4,439,156 A | * | 3/1984 | Marshall | F41G 3/28 434/12 |
| 5,696,319 A | * | 12/1997 | Chung | G01M 99/00 606/57 |

(Continued)

FOREIGN PATENT DOCUMENTS

| | | | | |
|---|---|---|---|---|
| CN | 209912211 U | * | 1/2020 | |
| KR | 20110087442 A | * | 8/2011 | .......... G01M 99/008 |
| WO | 2006/135284 | | 12/2006 | |

OTHER PUBLICATIONS

International Search Report and Written Opinion dated Jan. 20, 2021 for corresponding International Application No. PCT/US2020/054512.

*Primary Examiner* — Natalie Huls
(74) *Attorney, Agent, or Firm* — Renner, Otto, Boisselle & Sklar, LLP

(57) ABSTRACT

A simulated payload apparatus (SPA) for testing in a flight motion system (FMS), which has a body for mounting in the FMS, and which simulates an actual payload during the FMS test. The SPA may include a plurality of adjustable weights that are mountable on and/or removable from the body to vary the mass and/or center of gravity of the SPA. The SPA may include an adjustable bracket for interfacing with a motion drive of the FMS, in which the bracket is positionable along the body to vary the moment of inertia of the SPA. The SPA may include an onboard electronic measurement device that is configured to measure a motion characteristic of the SPA and/or communicate information about the measured motion characteristic in real-time during the FMS test. The SPA may include a laser alignment for aligning the SPA relative to test equipment of the FMS.

20 Claims, 5 Drawing Sheets

(56) References Cited

U.S. PATENT DOCUMENTS

| | | | |
|---|---|---|---|
| 6,619,960 B1* | 9/2003 | Horn | G09B 9/10 |
| | | | 434/37 |
| 9,454,911 B2* | 9/2016 | Finigan | G01N 3/04 |
| 2010/0028837 A1* | 2/2010 | Holloway | G09B 9/08 |
| | | | 434/30 |
| 2010/0030536 A1* | 2/2010 | Marsh | G01C 15/002 |
| | | | 703/2 |
| 2013/0110314 A1 | 5/2013 | Stieff | |
| 2016/0370257 A1 | 12/2016 | Osterhage | |

* cited by examiner

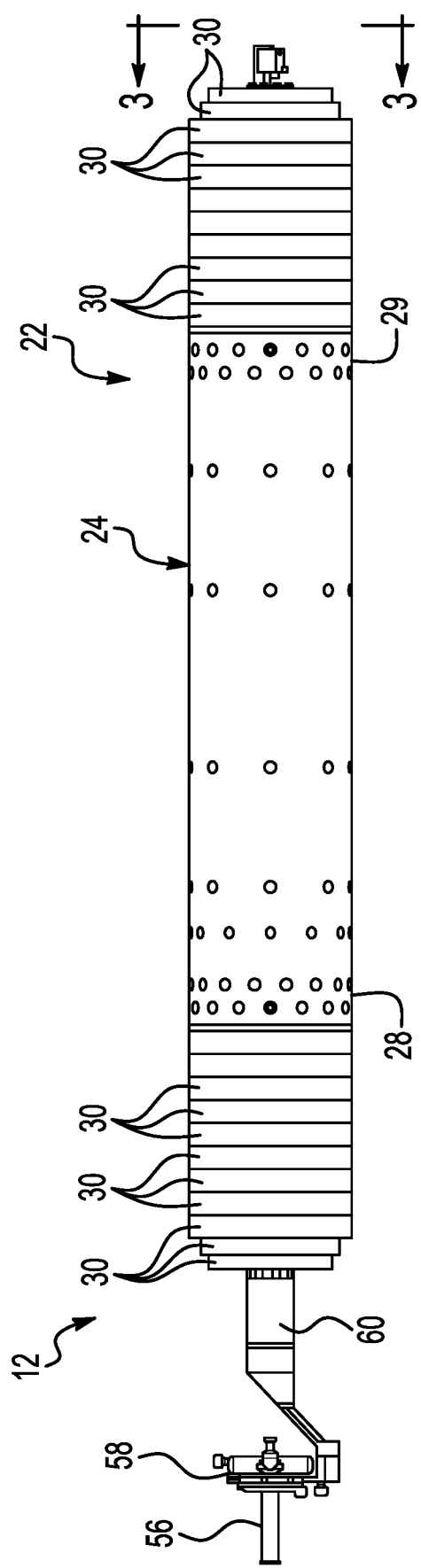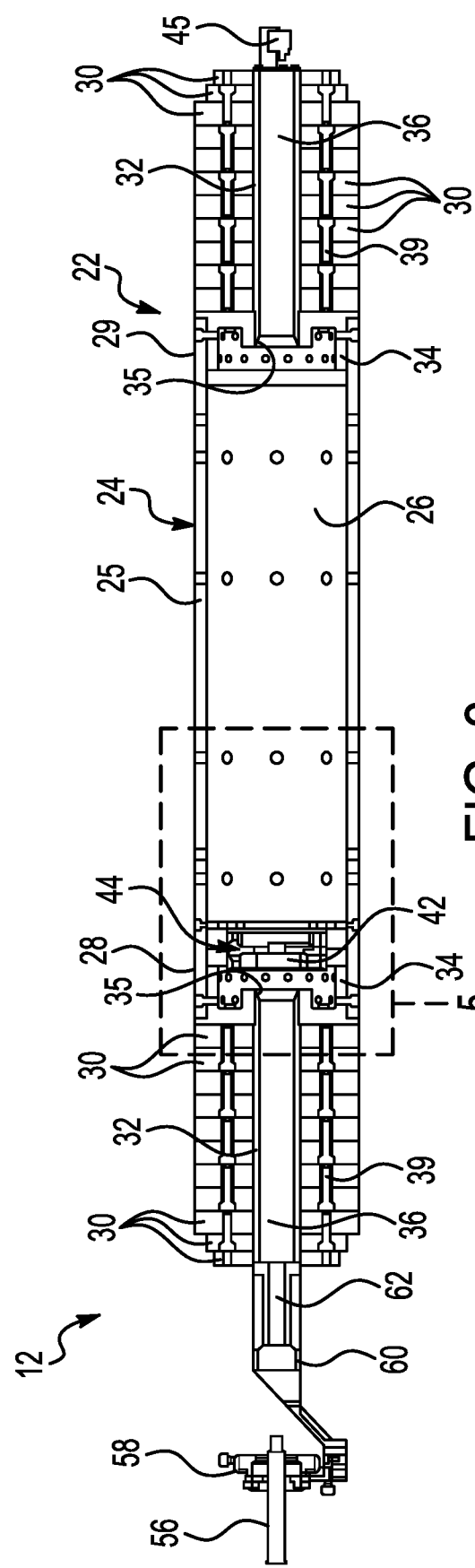

SIMULATED PAYLOAD APPARATUS FOR FLIGHT MOTION SYSTEM TESTING

TECHNICAL FIELD

The present disclosure relates generally to flight motion systems, and more particularly to a simulated payload apparatus for use with such flight motion systems during flight simulation testing.

BACKGROUND

Flight motion systems generally are used to simulate the movements and forces that an actual payload will experience during flight. In some applications, the simulated payload, or unit under test, may simulate a payload that is expensive or difficult to test itself, such as a missile or other munition. In such scenarios, a dummy load, or representative mass, is fabricated to simulate the actual payload during the flight motion system test. These fabricated dummy loads typically are application specific to simulate the one actual payload intended for simulation. Accordingly, this conventional procedure of using dummy loads requires design, review, fabrication and test to simulate each specific actual payload, which is labor and cost intensive. In addition, the dummy loads often do not account for simulation of the mass and placement of ancillary components of the actual payload, such as cables, bolts, spacers, and the like. Furthermore, the use of dummy loads typically requires a separate alignment and calibration procedure to be performed for aligning the unit under test with the flight motion system and/or other equipment in the testing facility, which is labor intensive.

SUMMARY

An aspect of the present disclosure provides a simulated payload apparatus having one or more advantages over conventional dummy loads, including: enhanced tailorability for simulating many different actual payloads; onboard electronics for measuring actual data about the flight motion system test in real-time and/or for communicating the measured data in real-time; and/or providing enhanced alignment features for aligning the simulated payload apparatus relative to the flight motion system and/or other testing equipment within the test facility.

More particularly, according to an aspect of the present disclosure, a simulated payload apparatus for testing in a flight motion system, includes: a body for being mounted in the flight motion system; and a plurality of adjustable weights mounted on the body; wherein the plurality of adjustable weights are mountable on the body and/or removable from the body to vary the mass and/or center of gravity of the simulated payload apparatus for simulating a corresponding actual payload during the flight motion system testing.

According to an embodiment of any paragraph(s) of this summary, the body includes a central body portion that is mountable in the flight motion system, and wherein the body includes first and second supports extending from the central body portion, wherein the adjustable weights are slidably mountable on the first and second supports.

According to an embodiment of any paragraph(s) of this summary, each of the plurality of adjustable weights has a fastening receiver for receiving a fastener that couples adjacent ones of the plurality of adjustable weights to each other.

According to an embodiment of any paragraph(s) of this summary, the plurality of adjustable weights have the same shape, or wherein at least some of the plurality of adjustable weights have a different shape.

According to an embodiment of any paragraph(s) of this summary, the plurality of adjustable weights have the same mass or density; or wherein at least some of the plurality of adjustable weights have a different mass or density.

According to an embodiment of any paragraph(s) of this summary, the simulated payload apparatus further comprises an adjustable bracket mounted to the body; wherein the adjustable bracket is configured to interface with a motion drive of the flight motion system; and wherein the adjustable bracket is positionable along the body to vary the moment of inertia of the simulated payload apparatus for simulating a corresponding actual payload during the flight motion system testing.

According to an embodiment of any paragraph(s) of this summary, the simulated payload apparatus further comprises an onboard sensor operably coupled to the body; wherein the onboard sensor is configured to measure a motion characteristic of the body during the flight system testing.

According to an embodiment of any paragraph(s) of this summary, the simulated payload apparatus further comprises an alignment fixture operably mounted to the body, and a laser mounted in the alignment fixture; wherein the alignment fixture is adjustable to align a beam of the laser with the target wall to thereby enable alignment of the body relative to the target wall.

According to another aspect of the present disclosure, a simulated payload apparatus for testing in a flight motion system having a motion drive for moving the simulated payload apparatus, the simulated payload apparatus including: a body for being mounted in the flight motion system; and an adjustable bracket mounted on the body, wherein the adjustable bracket is configured to interface with the motion drive; wherein the adjustable bracket is positionable along the body to vary the moment of inertia of the simulated payload apparatus for simulating a corresponding actual payload during the flight motion system testing.

According to an embodiment of any paragraph(s) of this summary, the bracket is slidably adjustable along the body.

According to an embodiment of any paragraph(s) of this summary, the bracket includes a plurality of circumferentially spaced apart clamps that clamp onto the body to fixably mount the bracket to the body during the flight motion system testing.

According to an embodiment of any paragraph(s) of this summary, the bracket further comprises a slip ring radially outwardly of the clamps, the slip ring being axially movable to move the clamps between a release position, in which clamps enable movement of bracket relative to the body; and lock position, in which the clamps engage the body to fix the position of the bracket relative to the body.

According to an embodiment of any paragraph(s) of this summary, the bracket further comprises a flange portion for interfacing with the motion drive, the flange portion having a plurality of tensioners that interact with the slip ring to axially move the slip ring, thereby moving the clamps between their lock and release positions.

According to another aspect of the present disclosure, a simulated payload apparatus for testing in a flight motion system, includes: a body for being mounted in the flight motion system; and an onboard sensor operably coupled to the body; wherein the onboard sensor is configured to measure a motion characteristic of the simulated payload apparatus in real-time during the flight system testing.

According to an embodiment of any paragraph(s) of this summary, the onboard sensor is contained in an onboard electronic measurement device that is operably coupled to the body, the electronic measurement device being configured to communicate, in real-time, information corresponding to the motion characteristic measured by the sensor.

According to an embodiment of any paragraph(s) of this summary, the electronic measurement device is configured to communicates wirelessly via a wireless transmitter of the electronic measurement device; or wherein the electronic measurement device is configured to communicate with a wired connection via a communications interface of the electronic measurement device.

According to an embodiment of any paragraph(s) of this summary, the electronic measurement device is an inertia measurement unit, and wherein the sensor is an accelerometer of the inertia measurement unit that is configured to sense and measure acceleration as the motion characteristic of the simulated payload apparatus during the flight system testing.

According to an embodiment of any paragraph(s) of this summary, the electronic measurement device is operably coupled to the body via a bracket; wherein a location of the electronic measurement device and the bracket along the body is axially adjustable; wherein the body has a plurality of axially spaced apart receivers for receiving corresponding fasteners extending through the bracket for enabling axial adjustment of the electronic measurement device and the bracket.

According to another aspect of the present disclosure, a simulated payload apparatus for testing in a flight motion system having a target wall, includes: a body for being mounted in the flight motion system; an alignment fixture operably mounted to the body; and a laser mounted in the alignment fixture; wherein the alignment fixture is adjustable to align a beam of the laser with the target wall to thereby enable alignment of the simulated payload apparatus relative to the target wall.

According to another aspect of the present disclosure, a flight motion system includes: a flight table; and the simulated payload apparatus according to any paragraph(s) of this summary.

The following description and the annexed drawings set forth certain illustrative embodiments of the present disclosure. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects according to the present disclosure.

FIG. 2 is a side view of the simulated payload apparatus in FIG. 1.

FIG. 3 is a cross-sectional side view of the simulated payload apparatus taken about the line 3-3 in FIG. 2.

DETAILED DESCRIPTION

The principles and aspects according to the present disclosure have particular application to flight motion systems, and more particularly to a simulated payload apparatus for use with such flight motion systems, which is used to simulate the characteristics that an actual payload will experience during flight. Such a simulated payload apparatus may be used to simulate a missile or other munition, and thus will be described below chiefly in this context. It is understood, however, that the principles and aspects of the present disclosure may be applicable to simulating the flight characteristics of other types of payloads and/or may be used for testing with other suitable flight motion systems, as would be understood by those having ordinary skill in the art.

Figure 1:
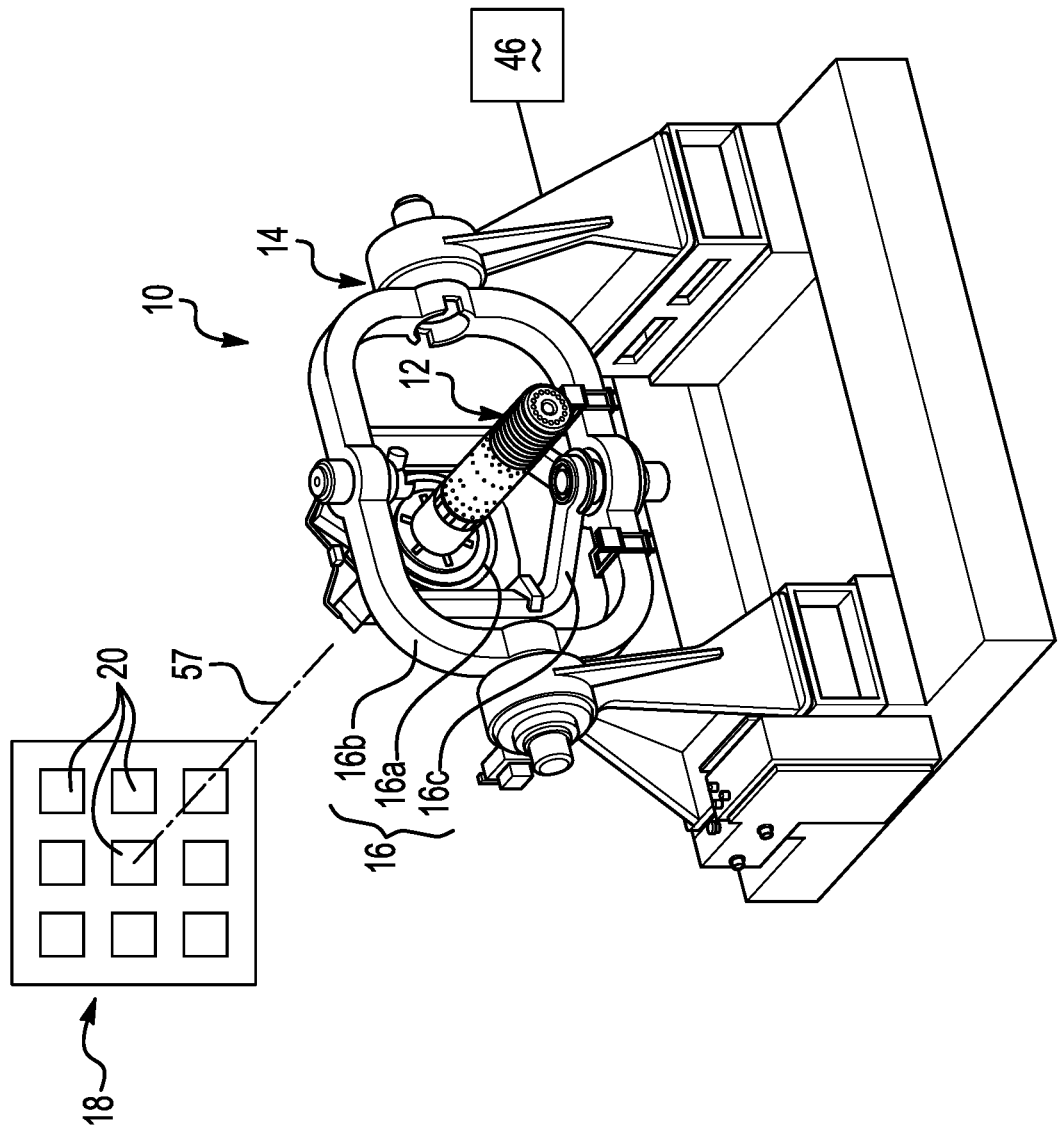
FIG. 1 is a perspective view of a flight motion system and an exemplary simulated payload apparatus according to an embodiment of the present disclosure.

Referring to FIG. 1, a flight motion system 10 and an exemplary simulated payload apparatus (SPA) 12 are shown. The flight motion system 10 (also referred to as a flight simulator) may be any conventional or specially adapted flight motion system that is used to move the SPA 12 for simulating the flight characteristics of an actual payload. In exemplary embodiments, the flight motion system 10 includes a flight table 14 having one or more motion drives 16 for moving the SPA 12 with one or more degrees of freedom. For example, the motion drives 16 may include electric drives (e.g., electric actuators, such as electric motors), or the motion drives 16 may be hydraulically or pneumatically operable. In exemplary embodiments, the flight motion system 10 may move the SPA 12 with at least three degrees of freedom. For example, the flight motion system 10 has one or more of the three rotational degrees of freedom: pitch, roll, yaw. Alternatively or additionally, the flight motion system 10 may have one or more of the three linear degrees of freedom: heave, sway and surge. In the illustrated embodiment, for example, the flight motion system 10 has a roll drive 16a for causing roll movements of the SPA 12, a pitch drive 16b for causing pitch movements, and a yaw drive 16b for causing yaw movements.

In some applications, the SPA 12 (also referred to as the unit under test) simulates a missile or other munition. In such applications, the flight motion system 10 also may include a target positioning simulator for simulating targeting of the unit under test during a flight simulation. In such systems, the flight motion system 10 may include a target wall 18 having an array of emitters 20. For example, the target wall may include an array of RF emitters, commonly referred to as an RF horn array, which present various RF scenes to the unit under test. Alternatively the target wall may include an array of electro-optical (EO) emitters, for example.

Figure 4:
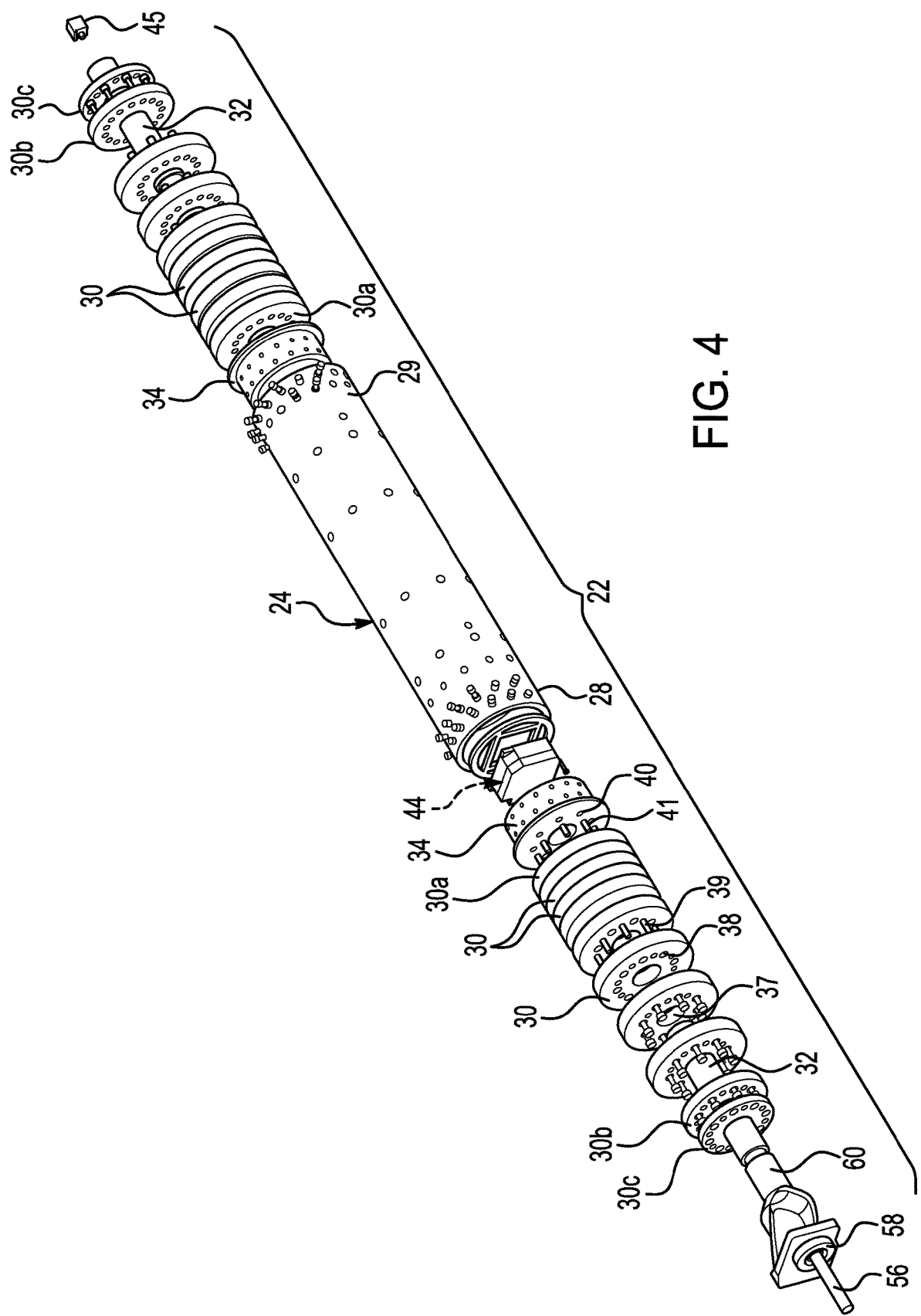
FIG. 4 is an exploded isometric view of the simulated payload apparatus.

Referring to FIGS. 2-4, the exemplary SPA 12 is shown in further detail. As shown, the SPA 12 includes a body 22 that is mountable in the flight motion system 10. The body 22 includes a main body portion 24, such as a central body portion, which may constitute a majority of the overall body 22 of the SPA 12. In exemplary embodiments, the main body portion 24 may have an internal cavity 26 formed therein.

The internal cavity 26 may be configured for containing other testing equipment associated with the flight motion system testing, as described in further detail below. In the illustrated embodiment, the internal cavity 26 extends from one end portion 28 of the main body portion 24 to an opposite end portion 29 of the main body portion 24, such as to facilitate connection of the test equipment contained in the cavity 26.

Generally, the overall body 22, including the main body portion 24, should have sufficient strength to withstand the forces exerted on SPA 12 during the flight motion system testing. In the illustrated embodiment, for example, the main body portion 24 is formed as a hollow cylinder having a cylindrical sidewall 25 with sufficient thickness to withstand the forces during testing, along with the forces of other components being mounted thereto during the test. The main body portion 24 may be formed of any suitable material, such as aluminum, stainless steel, nickel-based superalloys, or the like, for providing suitable strength to the main body portion 24.

In exemplary embodiments, the SPA 12 includes a plurality of adjustable weights 30 that are mountable to or removable from portions of the SPA body 22. In this manner, each of the weights 30 also contributes to forming a portion of the overall body 22 of the SPA 12. Generally, the plurality of adjustable weights 30 may be moved along the body 22 of the SPA 12 and/or removed as needed to represent a mass and/or center of gravity of the actual payload to be simulated during the flight motion system test. For example, removing a weight 30 from one or both sides of the SPA 12 will result in a lower total mass and may cause a shift in the center of gravity of the SPA 12. The ability to adjust the mass and center of gravity position also allows for varying the moment of inertia of the SPA 12 for testing. In this manner, the adjustable and reusable weights 30 enhance the tailorability and simulation capabilities of the SPA 12 by enabling the SPA 12 to mimic the mass, center of gravity and/or moment of inertia characteristics for a multitude of different actual payload designs. The adaptability and reusability of the adjustable weights 30 also enables the test facility to reduce or eliminate the need to design and fabricate individual units under test for each new design of an actual payload.

In the illustrated embodiment, the body 22 of the SPA 12 includes a pair of supports 32 that extend in the axial direction from the opposite end portions 28, 29 of the main body portion 24. As shown, the supports 32 are operably coupled to mounting plates 34, which are operably coupled to the opposite end portions 28, 29 of the main body portion 24, such as via one or more fasteners (e.g., bolts, screws or the like). In exemplary embodiments, the supports 32 are configured as support rods (also referred to with 32), such as cylindrical rods. The support rods 32 may be slidably inserted into respective holes 35 in the mounting plates 34 and secured therein such as with an interference fit and/or with suitable fasteners. The support rods 32 may each have an internal passage 36 that allows for connections, such as electrical conduits, to pass through the support rods 32 and through the holes 35 in the mounting plates 34 for connection to testing equipment contained in the internal cavity 26 of the SPA 12. Generally, the supports 32 have a suitable configuration and/or are made of a suitable material to provide sufficient strength to support the adjustable weights 30 and/or other components mounted thereto during the flight motion system testing.

In exemplary embodiments, each of the plurality of weights 30 is configured as a plate or cylindrical round that is slidably mountable or slidably removable from the respective supports 32. In the illustrated embodiment, for example, each weight 30 includes a through-hole 37 that is sized to allow the support rod 32 to slide therethrough. In exemplary embodiments, each plate 30 may include one or more receivers 38 (e.g., threaded bores) for receiving one or more fasteners 39 (e.g. screws), thereby allowing adjacent weights 30 to be secured together. The mounting plates 34 also may include one or more receivers 40 for receiving one or more fasteners 41, which enables the respectively adjacent weights 30a (FIG. 4) to be secured to the mounting plates 34.

In exemplary embodiments, the set of adjustable weights 30 may include weights having different masses, densities and/or shapes, which may affect the mass, center of gravity and/or moment of inertia of the SPA 12. For example, the set of weights 30 on each side of the SPA 12 may include heavier weights 30a (e.g., 4.5 kg to 20 kg), intermediate weights 30b (e.g., 2.25 kg to 4.5 kg), and/or lighter weights 30c (e.g., 0.5 kg to 2.25 kg) (collectively referred to as weights 30). Any combination of such weights 30 may be utilized in any manner to achieve the desired result. Alternatively or additionally, the adjustable weights 30 also may have different shapes (e.g., diameters, thicknesses, etc.). Alternatively or additionally, the adjustable weights 30 may be made of different materials, such as materials having different densities. For example, some weights 30 may be made of tungsten or the like, while other weights 30 may be made of steel, aluminum or the like. Such fine tuning capabilities of the SPA 12 enables improved simulation of the mass, center of gravity, and/or moment of inertia of the actual payload during the flight motion system testing. This provides for a higher degree of certainty in the simulation, which can be adjusted as needed to account for components such as cables, cooling liquid, sensors, and the like. Therefore, such data provided by testing the SPA 12 can, in turn, improve the design of the actual payload.

In exemplary embodiments, the SPA 12 includes one or more onboard sensors 42 that are configured to sense and measure one or more motion characteristics of the SPA 12 in real-time during the flight motion simulation. Such motion characteristics may include, for example, acceleration (e.g., linear or angular), delta velocities, orientation, inertia, etc. of the SPA 12. Unlike use of conventional dummy loads in which the flight motion system externally measures such motion characteristics (e.g., via optical sensors) and then inferentially calculates the motion characteristics based on this external data, the onboard sensor(s) 42 of the SPA 12 measure the actual motion characteristics of the SPA 12 in real-time during the flight motion system test. This information may then be used in the actual payload design to better assess the impact of these motion characteristics on the final actual payload.

The onboard sensor(s) 42 may be operably coupled to any suitable portion of the overall body 22 of the SPA 12. For example, the onboard sensor(s) 42 may be located within the internal cavity 26 of the main body portion 24. In exemplary embodiments, the onboard sensor(s) 42 are located in strategic location(s) such that the motion characteristics (e.g. acceleration) may be measured accurately. Such data measured by the onboard sensor(s) 42 may then provide enhanced reliability of the simulation of payload performance under flight motion simulation stressing conditions, as well as independent reliability of the FMS performance and FMS controller feedback response and accuracy.

The onboard sensor(s) 42 may be included in one or more onboard electronic measurement devices 44 having other suitable electronics such as memory for storing, processors for processing and/or transmitters or interfaces for communicating data associated with the measurements from the sensor(s) 42. In some embodiments, the onboard electronic measurement device(s) 44 may have electronic memory (e.g., non-transitory computer readable medium, such as a solid state device) which allows the measured data to be stored. This data may be read from the memory by operable connection of the electronic measurement device 44 to an external computer 46 (e.g., having a processor, random access memory, data storage, etc.) or any suitable processor, for example. The external computer 46 (FIG. 1) may be configured to control the flight motion system 10 in a conventional manner. The connection to the external computer 46 may be made via a wired connection or a wireless connection. The wired connection may be made by routing electrical cables along or through the SPA 12 (e.g. via passage 36 and cavity 26) and connecting to a communications interface (e.g., USB port) of the electronic measurement device 44; or the wired connection may be made by removing the electronic measurement device 44 and then connecting it to the external computer 46, or any computer. The wireless communication may be made using a transmitter of the electronic measurement device 44, which may utilize any suitable wireless protocol, such as Bluetooth, NFC, etc.

In exemplary embodiments, the electronic measurement device(s) 44 of the SPA 12 also are configured to communicate information associated with the measurements from the sensor(s) 42 in real-time during the flight motion system testing. This may include communication of the raw data or already-processed data. Such communication may be made to the external computer 46, for example, via wired or wireless connections, as described above. This enables the data collected in real-time to be used during the flight motion system testing, such as in a feedback loop.

In exemplary embodiments, the electronic measurement device(s) 44 having the onboard sensor(s) 42 of the SPA 12 include inertia measurement unit(s) (IMUs). The IMU (also referred to with reference numeral 44) may be a conventional IMU, or may be an IMU specifically designed for the actual payload to be simulated. The IMU 44 is an electronic device (e.g., sensors and circuitry) that measures and communicates the SPA's specific force (e.g., acceleration), angular or linear rate, and/or orientation. The IMU 44 may include one or more sensors 42, such as an accelerometer (e.g., piezoelectric) for detecting linear acceleration, a gyroscope for detecting rotational rate, and/or magnetometer for detecting orientation, for example.

In exemplary embodiments, the onboard sensor(s) 42 and/or electronic measurement device(s) 44 (e.g., IMU) that are operably coupled to the body 22 may be adjustably located. For example, the onboard sensor(s) 42 and/or electronic measurement device(s) 44 may be strategically located at any point along the axial length and/or radial direction of the overall body 22 (e.g., main body portion 24, supports 32, and/or adjustable weights 30). This enables the sensor(s) 42 to better mimic the location of the actual sensors (e.g., actual IMU) for the actual payload being simulated. This, in turn, enhances the reliability of the data measured and communicated from the sensor(s) 42. Such adjustability of the sensor(s) 42 position also enhances the tailorability and simulation capabilities of the SPA 12 by enabling the SPA 12 to mimic such characteristics for many different actual payload designs.

Figure 5:
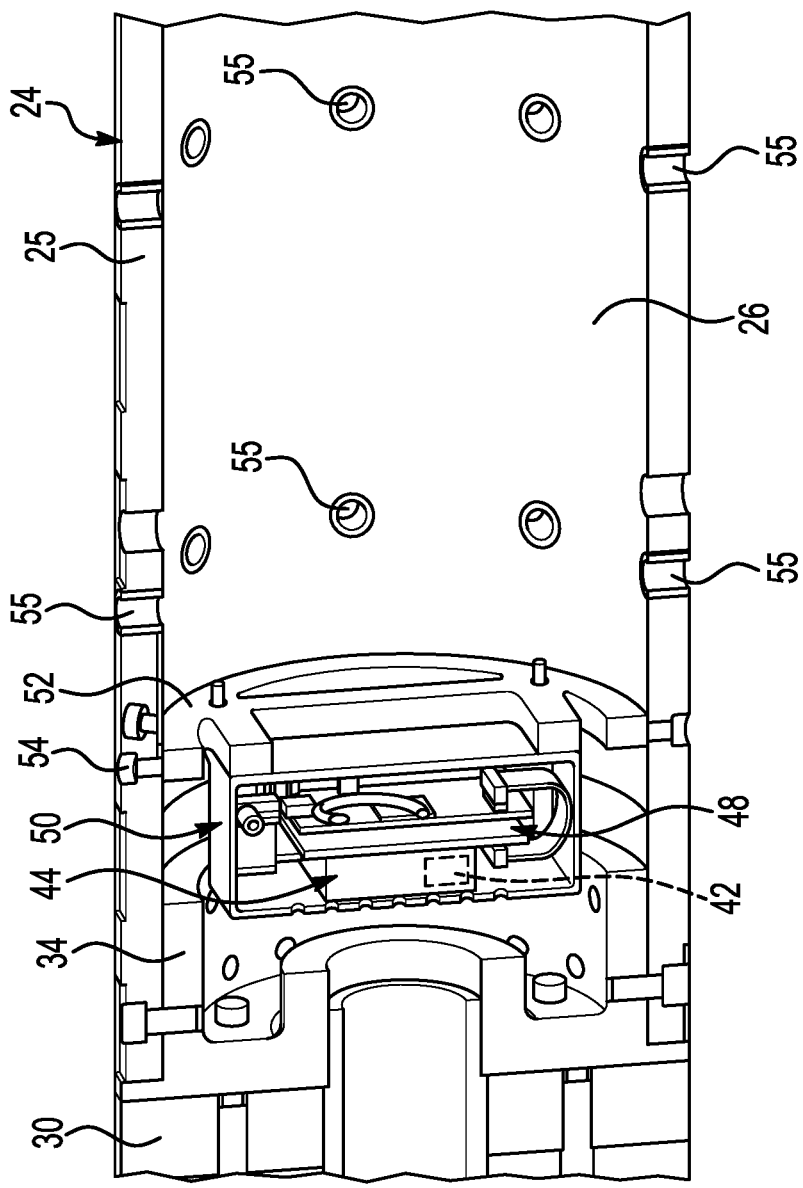
FIG. 5 is an enlarged isometric cross-sectional view of an exemplary electronic measurement device of the simulated payload apparatus taken from section 5 in FIG. 3.

Referring particularly to FIG. 5, the IMU 44 is shown as being located in the internal cavity 26 of the main body portion 24. As shown, the onboard sensor(s) 42 and circuitry 48 of the IMU (e.g., printed circuit boards, electrical wiring, connectors, transceivers, memory, etc.) may be disposed in an enclosure 50, such as an additively manufactured box. These sensor(s) 42 and circuitry 48 may be potted in the enclosure 50 with a damper material, such as an epoxy, to minimize vibration of the IMU sensor(s) 42 during testing, thereby localizing the motion characteristics being measured to the SPA 12 itself. As shown, the enclosure 50 is mounted to a mounting bracket 52, such as a metal or composite ring. The mounting bracket 52 may be operably coupled to the main body portion 24 via suitable fasteners 54 (e.g., screws), which may be received in receivers 55 (e.g., threaded bores) in the sidewall 25 of the main body portion 24. In exemplary embodiments, the main body portion 24 includes axially spaced apart sets of the receivers 55, which allows the axial position of the bracket 52, and thus the IMU 44, to be adjusted as desired for simulating the particular actual payload. It is understood that the SPA 12 is not limited to one such electronic measurement device 44 (e.g., IMU) and other such measurement devices may be employed. For example, as shown in the illustrated embodiment, the SPA 12 also may include one or more onboard accelerometers 45, which may be located at any suitable position(s) on the body, such as mounted at one end of the body 22.

Referring again to FIGS. 2-4, in exemplary embodiments the SPA 12 provides a precision mounted laser 56 that enables fine pointing alignment of the flight table 14 to other test equipment in the facility. For example, the laser 56 may emit a beam 57 that enables alignment of the SPA 12 and/or flight table 14 to RF or EO generated targets on the target wall 18 (FIG. 1). This enables for faster installation of the SPA 12 into the flight motion system 10 and reduces stress to the SPA 12 during alignment activities. Such laser alignment also facilitates the expediency of other connection procedures, such as electrical alignment of antenna, for example. Overall, such laser alignment may provide increased confidence of facility accuracy and understanding the opportunities for corrections in simulation, thereby allowing for higher fidelity simulation of in-flight operation. This, in turn, enables a more accurate reproduction of forces expected by the unit under test, which provides improved accuracy in predicting actual payload performance and durability.

As shown in the illustrated embodiment, the laser 56 is mounted in an alignment fixture 58. The alignment fixture 58 is mounted to a bracket 60, which is operably mounted to the body 22 of the SPA 12. For example, the bracket 60 may be operably coupled to the support 32, or may be operably coupled to one of the adjustable weights 30. As shown, the bracket 60 may have an internal passage 62 that connects with the internal passage 36 of the support 32, thereby allowing connections, such as wires, to be run therethrough. In exemplary embodiments, the alignment fixture 58 allows for one, two, three, or more axes of alignment of the laser 56. In the illustrated embodiment, for example, the alignment fixture 58 provides for five-axes of alignment.

Figure 6:
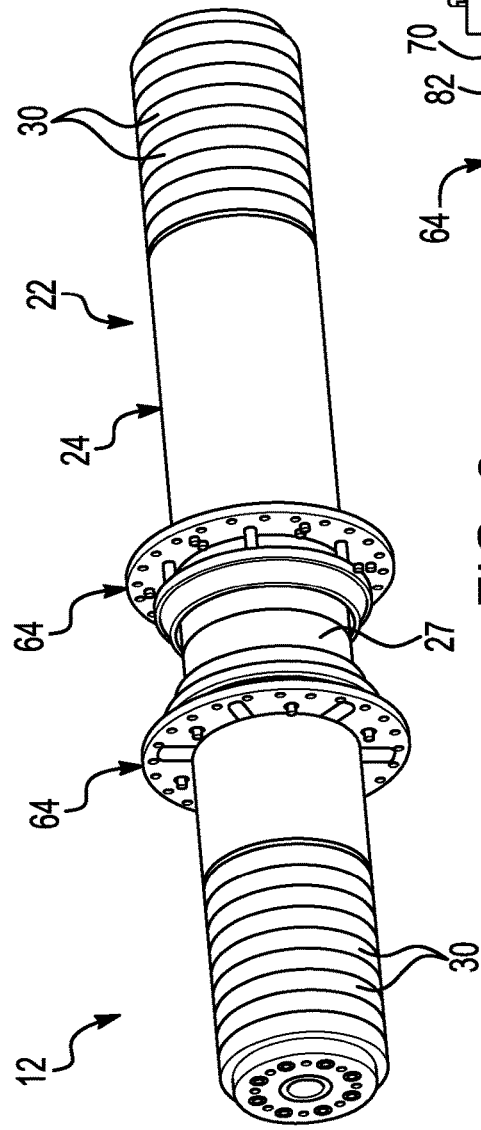
FIG. 6 is an isometric view of the simulated payload apparatus in FIG. 2 shown with a pair of exemplary mounting brackets, and without an exemplary laser alignment fixture.

Referring to FIG. 6, the exemplary SPA 12 also may include an adjustable drive bracket 64 mounted to the body 22, in which the drive bracket 64 is configured to interface with one or more of the motion drives 16 of the flight motion system 10. For example, in the illustrated embodiment the drive bracket 64 is configured to interface with the roll drive 16*a* (FIG. 1), in which the connection of the roll drive 16 to the other drives 16*b*, 16*c* also may permit flight simulation movement of the SPA 12 solely via the drive bracket 64. As shown, the adjustable drive bracket 64 is positionable along the body 22 of the SPA (e.g., main body portion 24, adjustable weights 30, etc.) to permit varying the moment of inertia of the SPA 12. This ability to vary the moment of inertia via the adjustment of the drive bracket 64 enhances the tailorability and simulation capability of the SPA 12 by enabling it to mimic the moment of inertia for a wide variety of actual payload designs.

In the illustrated embodiment, the SPA 12 includes two adjustable drive brackets 64 that are axially spaced apart from each other along the body 22 to permit operable connection to the roll drive 16a of the flight motion system 10. These two drive brackets 64 may be adjusted together to maintain the spacing therebetween, or the spacing may be adjusted for utilizing the SPA 12 with different roll drives or different flight motion machines. In exemplary embodiments, the body 22 (e.g., main body portion 24) may have rifling (spiral protrusions and/or grooves) on its external surface 27. The rifling may enhance engagement with the roll drive 16a, thereby enabling greater rotational velocities of the SPA 12 during the flight motion system test.

Figure 8:
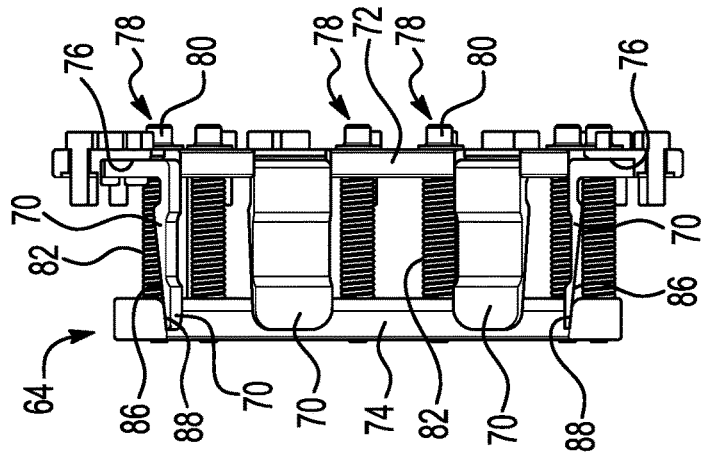
FIG. 8 is a cross-sectional side view of the mounting bracket.
Figure 7:
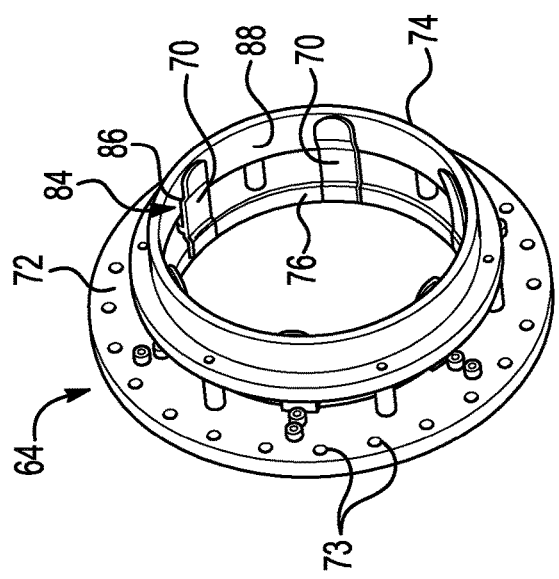
FIG. 7 is a perspective view of the exemplary mounting bracket.

Referring to FIGS. 7 and 8, the exemplary adjustable drive bracket 64 is shown in further detail. As shown, the drive bracket 64 includes a plurality of circumferentially spaced apart clamps 70, a flange 72 operably coupled to the clamps 70, and a slip ring 74 that interacts with the clamps 70 to move them between a lock and release position. In the release position, the clamps 70 enable movement of drive bracket 64 relative to the body 22; and in the lock position, the clamps 70 engage the body 22 to fix the position of the drive bracket 64 relative to the body 22.

The flange 72, which may be a collar, disc or ring, is configured to interface with the motion drive 16 of the flight motion system 10 in any suitable manner. For example, in the illustrated embodiment the flange 72 includes fastener receivers 73 for receiving fasteners for coupling the flange 72 to the roll drive 16a. The clamps 70 may be operably coupled to any suitable portion of the flange 72 in any suitable manner, such as via fastening, adhering, integrally forming, or otherwise securing. In the illustrated embodiment, the clamps 70 are secured to an inner rim portion 76 of the flange 72. As shown, the clamps 70 may be configured as tabs, or fingers, that are movable in the radial direction between their lock and release positions to engage or disengage from the body 22. In this manner, the clamps 70 may include or may be made of resilient elements or materials, or may be attached to the flange 72 with a pivot connection.

The flange 72 may be operably coupled to the slip ring 74 in any suitable manner. In the illustrated embodiment, for example, the slip ring 74 is operably coupled to the flange 72 with tensioners 78, which may include a fastener 80 (e.g., screw) and a spring 82. The slip ring 74 may be disposed radially outwardly of the clamps 70, and the clamps 70 may interface with the slip ring 74 such that axial movement of the slip ring 74 causes radial movement of the clamps 70 between their lock and release positions. Such an interface between the clamps 70 and the slip ring 74 may be a tapered interface. The clamps 70 may be flexible, resilient or pivotable, such that advancement of the tapered interface 84 causes the clamps 70 to flex or pivot between release (radially outward) or lock (radially inward) positions.

In the illustrated embodiment, the clamps 70 have tapered surfaces 86 that interface with a radially inner surface 88 of the slip ring 74. Alternatively or additionally, the inner surface 88 of the slip ring 74 may have the tapered surface. The clamps 70 may be made of a rigid or resilient material, such as stainless steel or other suitable material, which exhibits a biasing force when flexed. When the clamps 70 are in their release (e.g., radially outward) position, the tensioners 78 have been adjusted such that the slip ring 74 is axially moved to its release position away from the flange 72. The slip ring 74 in this position is at a narrow portion of the tapered surface 86 of the respective clamps 70, and thus does not exert sufficient force to overcome the biasing force of the clamps 70. As the tensioners 78 are adjusted (e.g., screwed into the slip ring 74), the slip ring 74 advances toward the flange 72 and along the tapered surfaces 86 of the clamps 70. As the slip ring 74 advances to the progressively thicker portions of the tapered surfaces 86 of the clamps 70, the slip ring 74 exerts a force that biases the clamps 70 radially inwardly to their lock position. The force exerted by the clamps 70 should be sufficient to fix the position of the drive bracket 64 relative to the SPA body 22 during the flight motion system test. The flange 72 interfaces with the motion drive 16 (e.g., via coupling to roll drive 16a) to thereby apply dynamic motion to the SPA body 22.

An exemplary simulated payload apparatus (SPA) for testing in a flight motion system has been described herein, which provides one or more advantages over conventional dummy loads traditionally used for such flight motion system tests. As discussed herein, conventional flight motion simulators typically require expensive design and fabrication of project specific dummy loads to simulate the moment of inertia and other characteristics of the unit under test for each new actual payload design.

According to an aspect of the present disclosure, an exemplary SPA includes adjustable and reusable weights for enhancing the tailorability and simulation of the mass and center of gravity of the actual payload. In this manner, the exemplary SPA may reduce or eliminate the need for design and fabrication of individual dummy loads when new designs for actual payloads are tested. In addition, the enhanced tailorability of the SPA may account for the mass and positioning of cabling, mounting hardware, sensors and the like to provide a more accurate simulation of the actual payload.

According to another aspect of the present disclosure, the SPA includes an adjustable bracket for interfacing with a motion drive of the FMS for enhancing the tailorability and simulation of the moment of inertia of the actual payload.

According to another aspect of the present disclosure, the SPA may include onboard measurement hardware, such as an inertia measurement unit, that enables the SPA to record data such as accelerations in real-time and/or communicate information associated with the data in real-time, such as to an external computer. The onboard sensor(s) of the SPA may enable characterization of the flight motion system and provide realistic acceleration and/or delta velocity measurements for the SPA during testing. In this manner, the exemplary SPA may provide more reliable results via actual onboard measurements compared to calculated acceleration data. In addition, such an onboard sensor may reduce or eliminate the need for separate measurement hardware.

According to another aspect of the present disclosure, the SPA may include an onboard laser alignment fixture for mounting a laser, which may be used for alignment of the apparatus and/or flight table of the flight motion system relative to other testing equipment in the test facility. In this manner, the exemplary SPA may reduce or eliminate the need for separate alignment hardware. Such alignment also may facilitate the install and/or alignment of other components.

Generally, the exemplary SPA including one or more of the foregoing aspects may reduce the design time, fabrication time, and overall costs that otherwise would be required when using conventional dummy loads. For example, the exemplary SPA may incur the design and labor costs one time with little or no additional design, fabrication or procurement for simulating various different actual payloads. In addition, the user may need to only store a single SPA to cover a variety of different applications, compared to storing numerous application specific dummy loads, which such dummy loads typically take up a relatively large footprint (e.g., 60 cm×40 cm dia.) and have significant weight (e.g., about 115 kg).

As used herein, an "operable coupling," or a connection by which entities are "operably" coupled, mounted, connected, etc., is one in which the entities are connected in such a way that the entities may perform as intended. An operable connection may be a direct connection or an indirect connection in which an intermediate entity or entities cooperate or otherwise are part of the connection or are in between the operably connected entities.

An "operable coupling," or a connection by which entities are "operably" coupled or connected, also may be one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A simulated payload apparatus for testing in a flight motion system, the simulated payload apparatus comprising:
    a body for being mounted in the flight motion system; and
    a plurality of adjustable weights mounted on the body;
    wherein the plurality of adjustable weights are mountable on the body and/or removable from the body to vary the mass and/or center of gravity of the simulated payload apparatus for simulating a corresponding actual payload during the flight motion system testing; and
    wherein the simulated payload apparatus further comprises a bracket mounted to the body, the bracket being configured to interface with a motion drive of the flight motion system.

2. The simulated payload apparatus according to claim 1, wherein the body includes a central body portion that is mountable in the flight motion system, and wherein the body includes first and second supports extending from the central body portion, wherein the adjustable weights are slidably mountable on the first and second supports.

3. The simulated payload apparatus according to claim 1, wherein each of the plurality of adjustable weights has a fastening receiver for receiving a fastener that couples adjacent ones of the plurality of adjustable weights to each other.

4. The simulated payload apparatus according to claim 1, wherein the plurality of adjustable weights have the same shape, or wherein at least some of the plurality of adjustable weights have a different shape.

5. The simulated payload apparatus according to claim 1, wherein the plurality of adjustable weights have the same mass or density; or wherein at least some of the plurality of adjustable weights have a different mass or density.

6. The simulated payload apparatus according to claim 1, wherein the bracket is an adjustable bracket;
    wherein the adjustable bracket is configured to interface with a motion drive of the flight motion system; and
    wherein the adjustable bracket is positionable along the body to vary the moment of inertia of the simulated payload apparatus for simulating a corresponding actual payload during the flight motion system testing.

7. The simulated payload apparatus according to claim 6, wherein the bracket is slidably adjustable along the body.

8. The simulated payload apparatus according to claim 6, wherein the bracket includes a plurality of circumferentially spaced apart clamps that clamp onto the body to fixably mount the bracket to the body during the flight motion system testing.

9. The simulated payload apparatus according to claim 8, wherein the bracket further comprises a slip ring radially outwardly of the clamps, the slip ring being axially movable to move the clamps between a release position, in which clamps enable movement of bracket relative to the body; and lock position, in which the clamps engage the body to fix the position of the bracket relative to the body.

10. The simulated payload apparatus according to claim 9, wherein the bracket further comprises a flange portion for interfacing with the motion drive, the flange portion having a plurality of tensioners that interact with the slip ring to axially move the slip ring, thereby moving the clamps between their lock and release positions.

11. The simulated payload apparatus according to claim 1, wherein the simulated payload apparatus further comprises an onboard sensor mounted to the body;
    wherein the onboard sensor is configured to measure a motion characteristic of the body during the flight system testing.

12. The simulated payload apparatus according to claim 7, wherein the onboard sensor is part of an inertia measurement unit that is configured to sense and measure acceleration as the motion characteristic of the simulated payload apparatus during the flight system testing.

13. The simulated payload apparatus according to claim 12, wherein the inertia measurement unit is configured to communicate, in real-time, information corresponding to the motion characteristic measured by the sensor.

14. The simulated payload apparatus according to claim 13, wherein the inertia measurement unit is configured to communicate wirelessly via a wireless transmitter; or wherein the inertia measurement unit is configured to communicate with a wired connection via a communications interface.

15. The simulated payload apparatus according to claim 12,
wherein the inertia measurement unit is operably coupled to the body via a bracket; and
wherein a location of the inertia measurement unit and the bracket along the body is axially adjustable.

16. The simulated payload apparatus according to claim 1,
wherein the simulated payload apparatus further comprises an alignment fixture operably mounted to the body, and a laser mounted in the alignment fixture;
wherein the alignment fixture is adjustable to align a beam of the laser with the target wall to thereby enable alignment of the body relative to the target wall.

17. A flight motion system comprising:
a flight table; and
the simulated payload apparatus according to claim 1.

18. A simulated payload apparatus for testing in a flight motion system, the simulated payload apparatus comprising:
a body for being mounted in the flight motion system; and
a plurality of adjustable weights mounted on the body;
wherein the plurality of adjustable weights are mountable on the body and/or removable from the body to vary the mass and/or center of gravity of the simulated payload apparatus for simulating a corresponding actual payload during the flight motion system testing;
wherein the simulated payload apparatus further comprises an alignment fixture operably mounted to the body, and a laser mounted in the alignment fixture; and
wherein the alignment fixture is adjustable to align a beam of the laser with the target wall to thereby enable alignment of the body relative to the target wall.

19. The simulated payload apparatus according to claim 18,
wherein the simulated payload apparatus further comprises an inertia measurement unit mounted to the body.

20. A flight motion system comprising:
a flight table; and
the simulated payload apparatus according to claim 18.

* * * * *